United States Patent
McCarty

(10) Patent No.: US 12,504,185 B2
(45) Date of Patent: Dec. 23, 2025

(54) INTEGRATED VENTILATION AND HEAT RECOVERY TERMINAL

(71) Applicant: Daniel P. McCarty, Edina, MN (US)

(72) Inventor: Daniel P. McCarty, Edina, MN (US)

(*) Notice: Subject to any disclaimer, the term of this patent is extended or adjusted under 35 U.S.C. 154(b) by 258 days.

(21) Appl. No.: 18/481,863

(22) Filed: Oct. 5, 2023

(65) Prior Publication Data
US 2024/0117979 A1    Apr. 11, 2024

Related U.S. Application Data

(60) Provisional application No. 63/378,414, filed on Oct. 5, 2022.

(51) Int. Cl.
*F24F 7/08* (2006.01)
*F24F 3/147* (2006.01)
*F24F 13/02* (2006.01)

(52) U.S. Cl.
CPC ............... *F24F 7/08* (2013.01); *F24F 3/147* (2013.01); *F24F 13/0227* (2013.01)

(58) Field of Classification Search
CPC .......... F24F 7/08; F24F 3/147; F24F 13/0227; F24F 2221/40; F24F 12/006
USPC .......................................................... 165/53
See application file for complete search history.

(56) References Cited

U.S. PATENT DOCUMENTS

| | | |
|---|---|---|
| 2,331,691 A | 10/1943 | Hubbard |
| 2,894,375 A | 7/1959 | Waterfill |
| 3,172,463 A | 3/1965 | Bowman |
| 3,623,542 A | 11/1971 | Fragnito et al. |
| 3,877,513 A | 4/1975 | Arledge, Jr. |
| 4,100,964 A | 7/1978 | Gorchev et al. |
| 4,508,022 A | 4/1985 | Finkelstein et al. |
| 4,526,227 A | 7/1985 | Baker |
| 4,657,178 A | 4/1987 | Meckler |
| 5,005,636 A | 4/1991 | Haessig |
| 5,014,609 A | 5/1991 | Weck |
| 5,826,641 A | 10/1998 | Bierwirth et al. |
| 6,099,406 A | 8/2000 | Demster |
| 6,250,373 B1 | 6/2001 | Vecchi et al. |
| 6,295,823 B1 | 10/2001 | Odom et al. |

(Continued)

OTHER PUBLICATIONS

Author: Not Available; Title: "E.H. Price Limited Product Catalog." 3 pages total, including cover page, back page, product page (J-89); Pub. Date: at least 2007; Publisher: Not Available; Place of publicaton: Not Available.

(Continued)

*Primary Examiner* — Steve S Tanenbaum
(74) *Attorney, Agent, or Firm* — Merchant & Gould P.C.

(57) ABSTRACT

An integrated classroom ventilation and heat recovery terminal can include a housing; a return air inlet for receiving air from an installed environment; a ventilation air outlet for delivering air to an induction displacement neutral wall air terminal unit; an outdoor air inlet for receiving air from outdoors; an exhaust air outlet for discharging exhaust to the outdoors; a heat exchanger for exchanging heat and humidity between air delivered to the return air inlet and air delivered to the outdoor air inlet; a first fan for moving air from the outdoor air inlet, a first side of the heat exchanger, and to the ventilation air outlet; and a second fan for moving air from the return air inlet, a second side of the heat exchanger, and to the exhaust air outlet.

14 Claims, 14 Drawing Sheets

(56) References Cited

U.S. PATENT DOCUMENTS

| | | |
|---|---|---|
| 7,013,969 B1 | 3/2006 | Loudermilk |
| 7,191,615 B2 | 3/2007 | Lee et al. |
| 7,334,424 B2 | 2/2008 | Park et al. |
| 7,413,007 B2 | 8/2008 | Yamaoka |
| 7,740,530 B2 | 6/2010 | Astourian |
| 8,469,783 B2 | 6/2013 | Juslin et al. |
| 9,551,496 B2 | 1/2017 | McCarty |
| 9,920,950 B2 * | 3/2018 | Ulmanen .................. F24F 1/01 |
| 9,982,899 B2 | 5/2018 | McCarty |
| 2006/0035579 A1 | 2/2006 | Choi et al. |
| 2008/0098750 A1 | 5/2008 | Busier |
| 2009/0038774 A1 | 2/2009 | Ogiso et al. |
| 2009/0241576 A1 | 10/2009 | Tsjui et al. |
| 2009/0264062 A1 | 10/2009 | Miller et al. |
| 2010/0140363 A1 | 6/2010 | Hirsch et al. |
| 2010/0206541 A1 | 8/2010 | Webster |
| 2011/0174475 A1 | 7/2011 | Tangney |
| 2011/0253350 A1 | 10/2011 | Belles |
| 2012/0015600 A1 | 1/2012 | Larsson |
| 2017/0356661 A1 * | 12/2017 | Fischer .................. F24F 3/153 |
| 2020/0116372 A1 * | 4/2020 | Fischer .................. F24F 12/003 |
| 2022/0228763 A1 * | 7/2022 | Fischer .................. F25B 5/04 |

OTHER PUBLICATIONS

Trox QLC1 Displacement Chilled Beams with Convective Heating Elements, 1 page (at least as early as Dec. 4, 2012).

"QLC1 Displacement with Induction for Classroom HVAC Applications," Product Catalog, Trox USA, Inc. (undated), 48 pages.

Oxygen 8, "A Breath of Fresh Air for HVAC Design", Jun. 3, 2020, 2 pages.

Oxygen 8, "Ventum Lite", Version 1.0.0.5, Dec. 7, 2022, 7 pages.

Oxygen 8, "A16 Submittal", May 26, 2020, 4 pages.

* cited by examiner

INTEGRATED VENTILATION AND HEAT RECOVERY TERMINAL

CROSS-REFERENCE TO RELATED APPLICATION

This application claims priority to U.S. Provisional Patent Application Ser. No. 63/378,414, filed on Oct. 5, 2022, the entirety of which is incorporated by reference herein.

BACKGROUND

Displacement ventilation systems are in widespread use in the HVAC industry. One particular application for such systems is in school buildings. Typically, a number of displacement air terminal devices will be located along a perimeter wall of a classroom space and are configured to deliver ventilation air to the space. The ventilation air is generally several degrees below the space set point temperature to ensure that the ventilation air effectively pools across the floor of the space. Due to the heat generated by the occupants and equipment in the space, the ventilation air is naturally drawn up by convection which ensures fresh air is continually delivered to the breathing zone of the occupants. The heated air continues to rise to the ceiling level where it can be removed from the space. Thus, those skilled in the art readily recognize the advantages of displacement ventilation air systems to both cool and ventilate a space in a highly efficient manner.

It is also known to configure displacement air terminal devices to have induction nozzles such that room air from the space can be conditioned, filtered, and returned to the space in a mixture with the ventilation air. This type of unit is sometimes referred to as an induction-displacement unit. In this type of system, a coil is provided in the return air path of the induction-displacement unit to condition the return air, as necessary. In the cooling mode, the coil will reduce the return air temperature to a few degrees below the space temperature to match the temperature of the ventilation air. In the heating mode, the coil may be set to raise the temperature of the return air such that the delivered air has a higher temperature than that of the air in the room. In this mode a minimum space temperature set point can be maintained. However, in doing so, the induction-displacement unit can no longer function as a displacement terminal unit due to the fact that the delivered air starts rising as soon as it leaves the unit instead of pooling across the floor. It is also known to combine heating capabilities while maintaining the induction-displacement supply air to the room. One such example of this is U.S. Pat. No. 9,982,899, the entirety of which is hereby incorporated by reference herein.

Multiple induction-displacement units are commonly configured to receive treated ventilation air from a single central air handling units in order to provide an energy efficient and comfortable indoor environment. In such arrangements, central air handling units condition and deliver ventilation air to the induction displacement units which in turn distribute the conditioned ventilation air to the space. Due to their large size, air handling units are typically located on a rooftop or in a separate mechanical room remote from the rooms in which the induction displacement units are located. Improvements are desired.

SUMMARY

A classroom air distribution system can include an integrated ventilation and heat recovery terminal comprising: a housing for mounting to a floor, the housing having a depth of twenty inches or less, and a height of less than thirty-two inches; a return air inlet for receiving air; a ventilation air outlet; an outdoor air inlet for receiving air from outdoors; an exhaust air outlet for discharging exhaust to the outdoors; a heat exchanger for exchanging heat and humidity between return air moving toward the exhaust air outlet and outdoor air moving toward the ventilation air outlet, the heat exchanger oriented to minimize the housing depth; a first fan for moving outdoor air from the outdoor air inlet, through a first side of the heat exchanger, and to the ventilation air outlet; a second fan for moving return air from the return air inlet, through a second side of the heat exchanger, and to the exhaust air outlet. The system can also include at least one induction-displacement neutral wall air terminal unit comprising: a supply airflow path extending from the ventilation air outlet and continuing through each of the at least one induction-displacement neutral wall air terminal units and to a supply air outlet at each of the at least one induction-displacement neutral wall air terminal units; a return airflow path extending from a return air duct and continuing to the return air inlet; a plurality of induction-type nozzles in direct fluid communication with the ventilation air outlet and being located upstream of the supply air outlet and being within a portion of the housing defining the supply airflow path such that an air flow from the ventilation air outlet flows through the plurality of induction-type nozzles and into the supply airflow path; and a plurality of displacement-type nozzles located between the supply air outlet and the plurality of induction-type nozzles and being within a portion of the housing defining the supply airflow path.

In some examples, the system includes an exhaust damper mounted to the housing and an intake damper mounted to the housing.

In some examples, the heat exchanger is a counterflow enthalpy flat plate type heat exchanger.

In some examples, the system further includes a pump for circulating a fluid to the at least one induction-displacement neutral wall air terminal unit.

In some examples, the integrated ventilation and heat recovery terminal further includes a multifunction coil section for conditioning air, the multifunction coil section positioned between the heat exchanger and the ventilation air outlet.

In some examples, at least one heat recovery induction-displacement neutral wall air terminal unit includes three induction-displacement neutral wall air terminal units.

In some examples, the housing of the integrated ventilation and heat recovery terminal has a depth equal to a depth of a housing of the at least one induction-displacement neutral wall air terminal unit.

In some examples, the housing of the integrated ventilation and heat recovery terminal has a length equal to a length of a housing of the at least one induction-displacement neutral wall air terminal unit.

In some examples, the housing of the integrated ventilation and heat recovery terminal has a height equal to a height of a housing of the at least one induction-displacement neutral wall air terminal unit.

An integrated classroom ventilation and heat recovery terminal can include: a housing for mounting to a floor, the housing having a depth of twenty inches or less, and a height of less than thirty-two inches; a return air inlet for receiving return air from an installed environment; a ventilation air outlet for delivering supply air to an induction displacement neutral wall air terminal unit, the ventilation air outlet arranged on the same side of the housing as the return air inlet; an outdoor air inlet for receiving outdoor air; an exhaust air outlet for discharging return air to the outdoors, the exhaust air outlet arranged on the same side of the housing as the outdoor air inlet; a heat exchanger for exchanging heat and humidity between return air moving toward the exhaust air outlet and outdoor air moving toward the ventilation air outlet, the heat exchanger oriented to minimize the housing depth; a first fan for moving outdoor air from the outdoor air inlet, through a first side of the heat exchanger, and to the ventilation air outlet; a second fan for moving return air from the return air inlet, through a second side of the heat exchanger, and to the exhaust air outlet; and a coil section for conditioning air, the multifunction coil section positioned between the heat exchanger and the ventilation air outlet.

In some examples, the terminal includes an exhaust damper mounted to the housing and an intake damper mounted to the housing.

In some examples, the heat exchanger is a counterflow enthalpy flat plate type heat exchanger.

In some examples, the heat exchanger, first fan, and second fan are located within a first housing that is received into a second housing.

In some examples, the coil section is located within the second housing.

DETAILED DESCRIPTION

Figure 1:
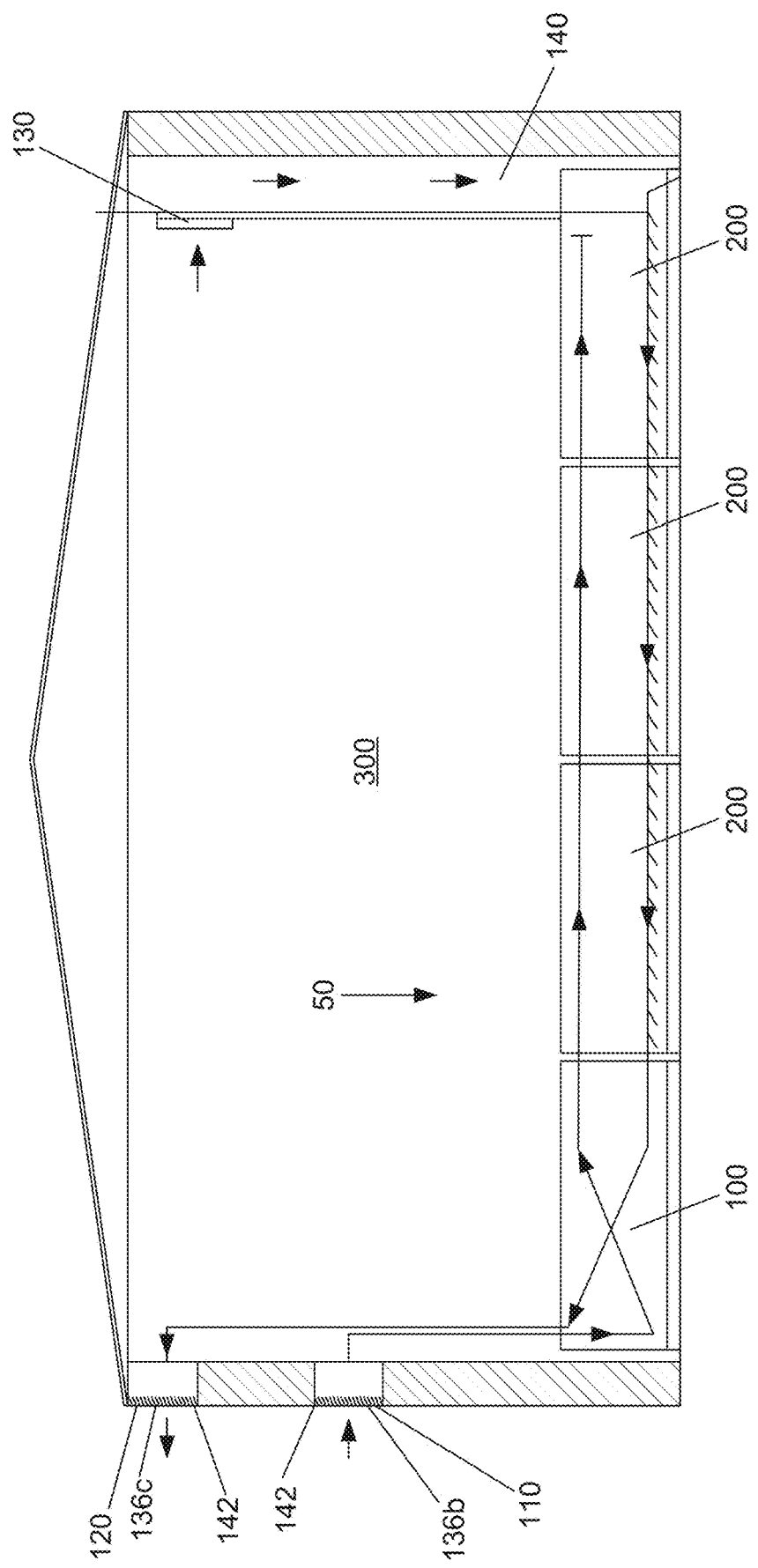
FIG. 1 is a schematic elevational view diagram of one embodiment of an air handling system in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

This disclosure relates to different aspects of air distribution systems for classrooms and other similar environments. Some aspects relate to air handling units, such as integrated ventilation and heat recovery terminals that are usable in constrained spaces with induction-displacement neutral wall air terminal units. Other aspects relate to piping arrangements for leveraging the same hot/cold water supply for multiple uses within an air distribution system. Additional aspects will be apparent to one of skill in the art.

In general, air handling units, such as integrated ventilation and heat recovery terminals, may pre-condition air that is then distributed to a space by another air handling unit, such as an induction-displacement neutral wall air terminal. The induction-displacement neutral wall air terminal may be located within the space to deliver to the space a supply airflow stream that includes a ventilation airflow stream from the integrated ventilation and heat recovery terminal and a return airflow stream induced by the ventilation airflow stream.

FIG. 1 shows an example of an installed environment having an air distribution system 50. The air distribution system 50 may include an air handling system unit 100, which may be characterized as being an integrated ventilation and heat recovery terminal. The air distribution system 50 may further include one or more air terminals 200, such as one or more induction-displacement units. In FIG. 1, a configuration is shown in which the unit 100 supplies air to three air terminals 200.

FIG. 1 also shows a general airflow schematic of the air distribution system 50 within an installed environment such as a classroom. Air is pulled into the unit 100 from an outdoor air intake 110. The air is conditioned by unit 100 which then delivers the conditioned air to the air terminals 200. As the air reaches each air terminal 200, the conditioned air is mixed with room air induced into the terminal and supplied to the room. In the example shown, the air conditioned by the unit 100 is delivered through the terminals 200 themselves to downstream terminals 200 such that no additional ducting is required for the delivery of ventilation air from the unit 100 to any of the terminals 200. During operation, the mixed air delivered by each terminal 200 rises in the room and stratifies at a level near the ceiling. At this upper level, a return duct inlet 130 is provided to return some of this air back to the unit 100. From the inlet 130, a return air path runs through a return duct or shroud 140 via an opening 140a, back through the air terminals 200 and through the unit 100, where it becomes exhaust air which exits the building at exhaust air discharge 120. Accordingly, once the return air is delivered back down to the terminals 200, no exposed or separate ducting is required in order to pass the return air through the terminals 200 and back to the unit 100.

One example of unit 100, and aspects thereof, is shown in FIGS. 3-7. The unit 100 has an outer housing 116 and may include a number of different sections including a first section 118, a second section 122, a third section 124, a fourth section 126, and a fifth section 128.

In one example, the outer housing 116 is made from 18-gauge painted steel and 1-inch single walled panels with a fiberglass board liner having a thermal resistance ("R-value") of 4.2. The 18-gauge steel may be treated to pass a thousand-hour salt spray test per ASTM B117. The housing may be any size suitable for the application. In one example, the housing has a depth of less than 20 inches and a height of less than 32 inches. In some examples, the housing 116 has the same height and depth as the housings of the terminals 200 such that a uniform appearance within the room is provided.

Figure 5:
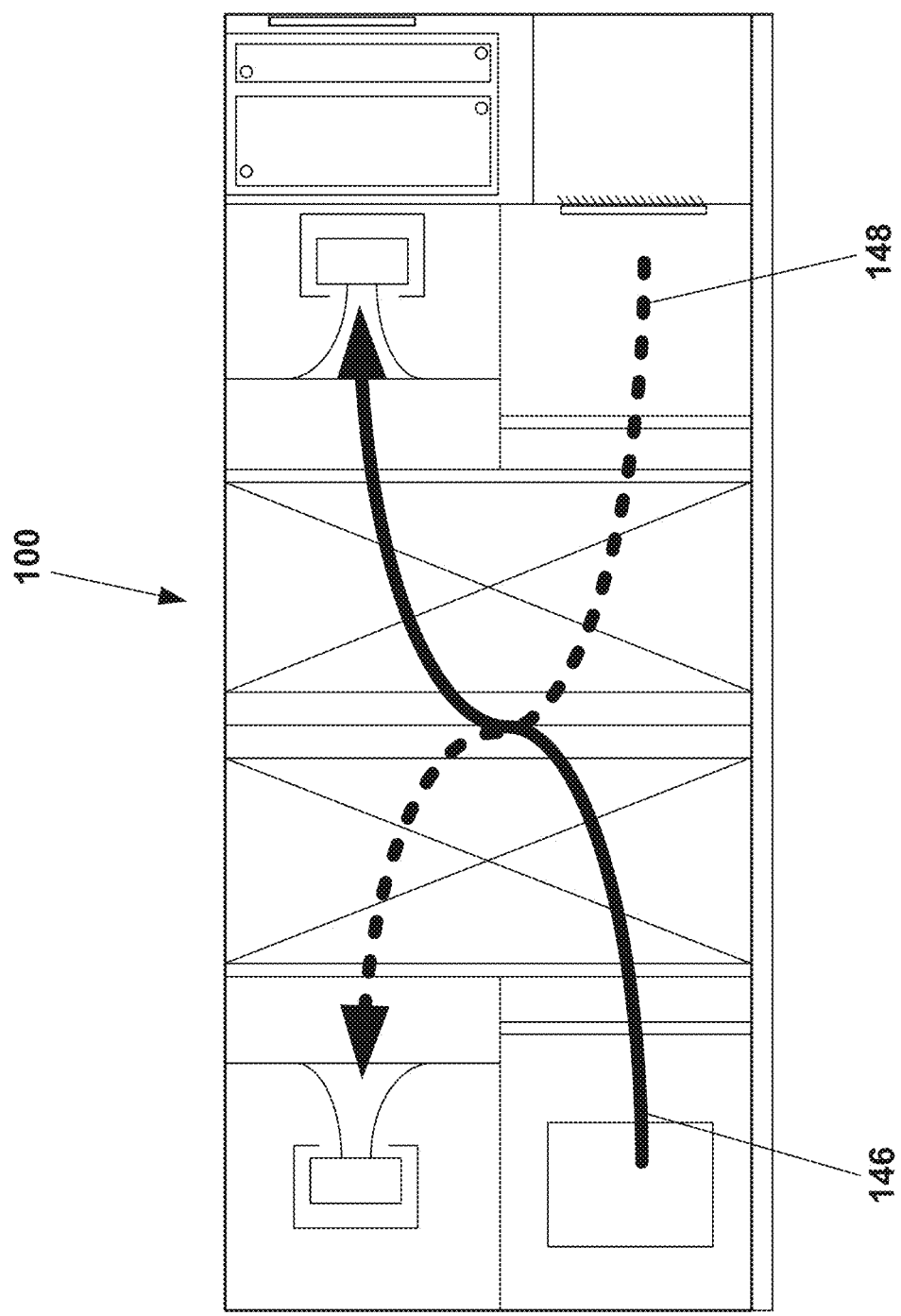
FIG. 5 is a cutout side view of the self-contained air handling unit assembly of FIG. 4 showing an example airflow path.
Figure 6:
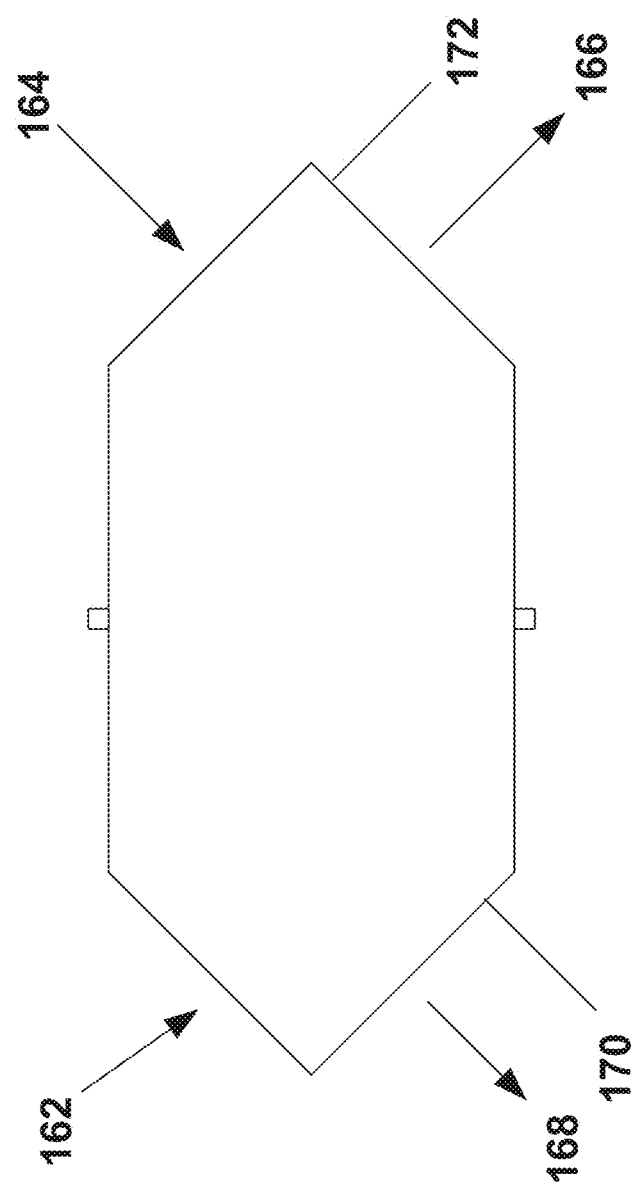
FIG. 6 is a schematic cross-sectional view of an example heat exchanger within the self-contained unit subassembly of FIG. 3.

In one example, the first section 118 includes an exhaust air outlet 102 and an outdoor air inlet 104. The first section may further include fans 112 at either or both locations in order to facilitate moving air through the unit 100. Outdoor air may be pulled in, while exhaust air may be pushed out by fans 112. The first section may further include a filter assembly 132 to clean outdoor air as it enters unit 100 through the outdoor air inlet 104. Additionally, a damper 136a may be included at the outdoor air inlet 104 to control intake air flow. In one example, the second section 122 is a spacer section. In one example, the third section includes a heat exchanger 114. In one example, the fourth section is a spacer section. In one example, the fifth section includes a ventilation air outlet 106 and a return air inlet 108. The fifth section may further include fans 112 at either or both locations in order to facilitate moving air through the unit 100. Ventilation air may be pushed out, while return air may be pulled in by fans 112. The fifth section may further include a filter assembly 132 to clean return air as it enters unit 100 through the return air inlet 108. The filter 132 may also be provided in a sixth section 129. The unit can also include the sixth section 129 that includes a coil section 138 for further conditioning air as it moves from the heat exchanger towards the ventilation air outlet. FIG. 5 shows an example of a ventilation air path 146 and a return air path 148 as they move through unit 100.

Figure 4:
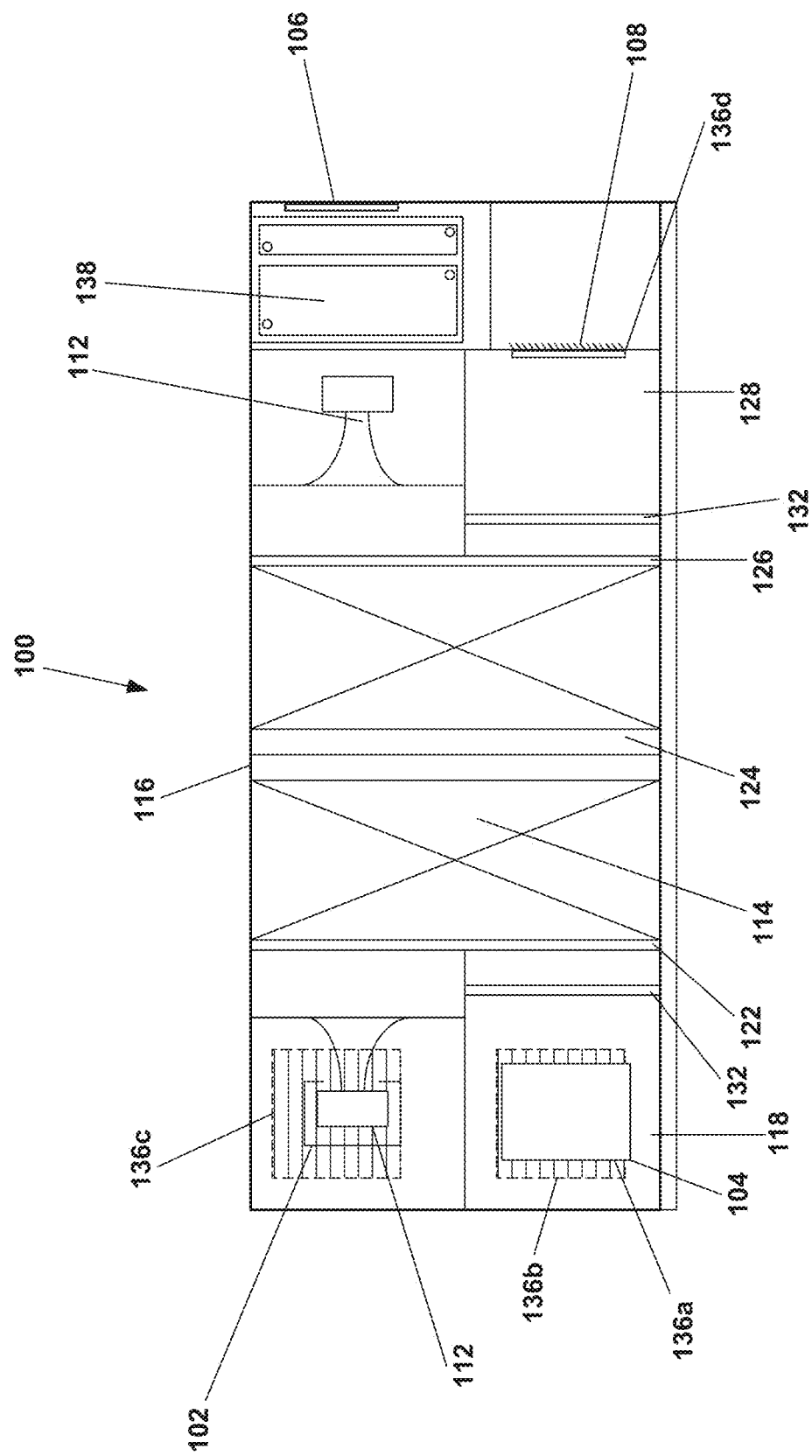
FIG. 4 is a schematic side view of a self-contained air handling assembly including the subassembly of FIG. 3.

The fans 112 may be arranged in a variety of ways to create effective airflow through the heat exchanger 114 and other components such as the coil section 138. FIG. 4 shows the fans configured in a draw-through configuration with respect to the heat exchanger 114. The draw-through configuration may be preferable for improved air distribution to the air terminals 200. Other configurations are also possible, such as a blow-through configuration where fan direction and placement are reversed. Blow-through configurations may offer lower energy consumption than the draw-through configurations.

The heat exchanger 114 may be a plate heat exchanger, such as a counterflow enthalpy plate heat exchanger, with no moving parts. A counterflow enthalpy plate heat exchanger typically includes a plurality of permeable or semi-permeable membrane plates that facilitate energy recovery by transferring both sensible and latent heat between the incoming outdoor air and the oppositely flowing outgoing return air. An example heat exchanger 114 is schematically shown on FIG. 6. Generally, the heat exchanger 114 has a first side 170 and a second side 172 and is composed of alternating flat plates, which create parallel channels for the air streams of each side to flow in opposite directions, maximizing heat and moisture transfer. Sensible heat is exchanged as the plates conduct heat from the warmer air to the cooler air, while latent heat transfer occurs through moisture migration within the plate material. This energy recovery process enhances the overall efficiency of the distribution system 50, reducing heating and cooling loads while maintaining optimal indoor air quality. Other types of heat exchangers may also be used. For example, rotary heat exchangers, heat pipe heat exchangers, or run-around coil heat exchangers could all be used. Outside air 162 entering through the outdoor air inlet 104 moves through the heat exchanger 114 as return air 164 entering from the return air inlet 108 moves through in the opposite direction. Without mixing, heat is transferred between the return air and the outdoor air. Outdoor air 162 becomes ventilation air 166 as outdoor air 162 moves through unit 100 to the ventilation air outlet 106. Similarly, return air 164 becomes exhaust air 168 as return air 164 moves through unit 100 to the exhaust outlet 102.

The filter assembly 132 may be any type of filtration system suitable for air handling units. For example, the filter assembly 132 may utilize high-efficiency particulate air filters. In another example, the filter assembly 132 may be a pleated panel filter, such as a Minimum Efficiency Reporting Value ("MERV") 8, 13, or 14 rated filter. Other filtration systems, such as activated carbon filters, UV filters, and electrostatic filters may also be used. Filtering dirt and debris from the incoming outdoor air is critical to improving air quality to the supplied space and ensuring that the other components downstream can operate effectively.

Figure 2:
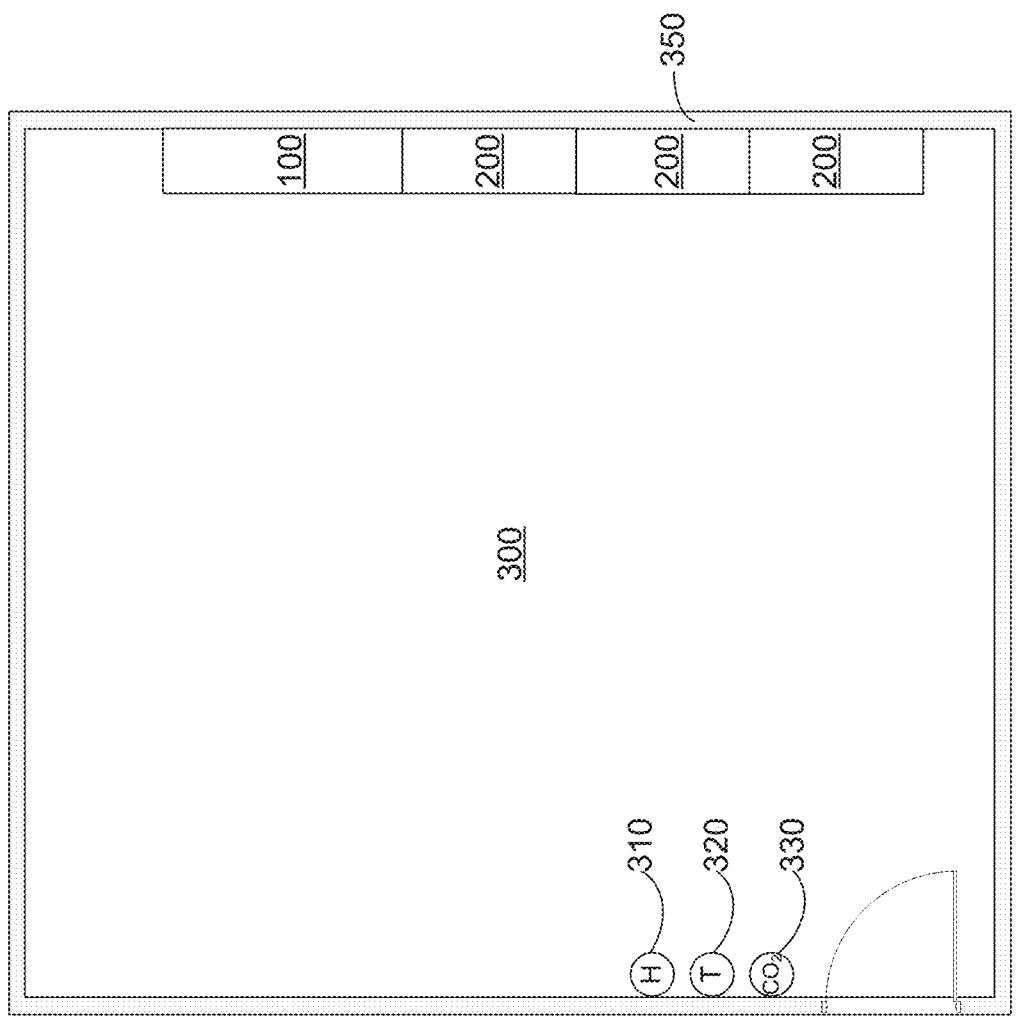
FIG. 2 is a schematic plan view diagram of the air handling system of FIG. 1.

Unit 100 may also include a control arrangement 134. The control arrangement 134 may include a signal port, a power-in port, a disconnect switch, and other controls. The control arrangement 134 may be automated to maintain desired settings or may be manually controlled. The control arrangement 134 may interface with a number of sensors positioned within a space 300. FIG. 2 shows an example space 300 that includes a humidity sensor 310, a temperature sensor 320, and a carbon dioxide sensor 330. In one example, the control arrangement 134 automatically uses data from the sensors 310, 320, 330 to maintain desired environmental conditions within space 300. The modes of operation of the control arrangement 134 allow a space to be heated, cooled, and ventilated simultaneously, as required.

The control arrangement 134 may use sensor data to control fans 112 and dampers 136. In one example, the control arrangement 134 provides control and power signals to the fans 112. Each fan 112 may be activated independently. When the exhaust outlet side fan 112 is activated, air is moved from the return air inlet 108 through the first side 170 of the heat exchanger 114, out of the exhaust air outlet 102, and through the exhaust air discharge 120 to the outdoors. Similarly, when the ventilation outlet side fan 112 is activated, air is moved from the outdoors, through the outdoor air intake 110, through the outdoor air inlet 104, through the second side 172 of the heat exchanger 114, and out of the ventilation air outlet 106 to the air terminals 200. FIG. 5 shows the air flow the fans may be arranged in a draw-through arrangement such that counterflowing airstreams are drawn through the heat exchanger 114. In some examples, the fans have a power usage of less than 1 watt/CFM and are controlled by 0-10V input signals from the control arrangement 134. The fans 112 may use 208 volts of supply power and run at a frequency of 60 hertz with single phase power. In some configurations, the control arrangement 134 is located remotely from the unit 100 in form of a controller or sub-controller connected to a building automation system. In some configurations, the control arrangement 134 is located within or on the unit 100 but is concealed such that no operator interface controls are exposed within the room.

The third section 114 may also include a bypass damper operated via the control arrangement 134 to bypass air around the heat exchanger 114 when conditions are not optimal for heat exchange. In some examples, dampers 136b, 136c are provided at the outdoor air intake 110 and exhaust air discharge 120 and are controlled and powered by the control arrangement 134. A damper 136d may also be included at the return air inlet 108 and controlled and powered by the control arrangement 134. The dampers 136 may run on a 120V input signal. The dampers 136 may be made from extruded heavy gauge 6063 aluminum with airfoil shaped blades that include rubber blade seals. The dampers 136 may further be spring return dampers.

Dampers 136 help regulate air flow within the air distribution system 50. Generally, dampers include plates or blades that adjust between an open position and a closed position to control the volume of air moving through the system 50. Actuators may be used to move the plates or blades between open and closed states, including partially open states. The dampers located at outdoor air intake 110 and exhaust air discharge 120 may further include louvers 142. Louvers 142 generally consist of angled slats that help prevent rain and other debris from entering the ductwork.

Figure 3:
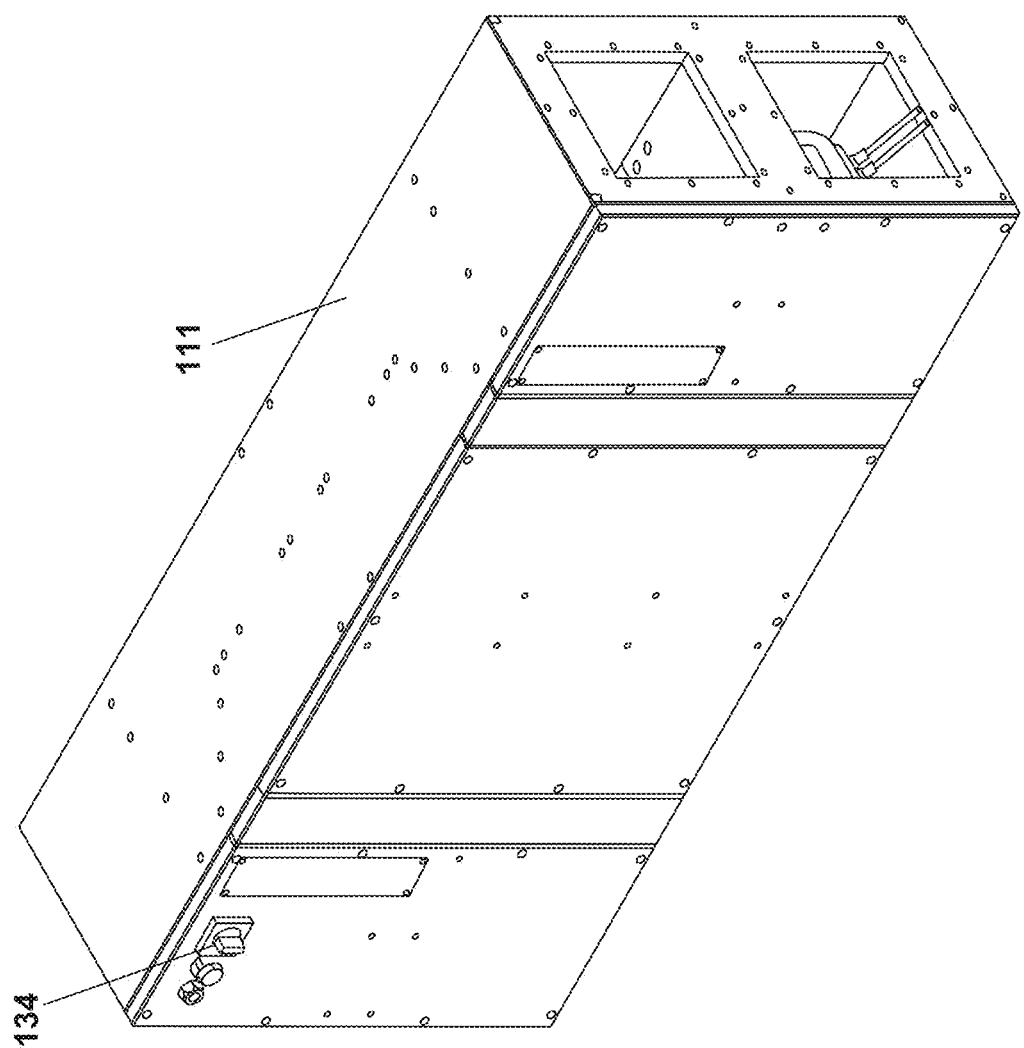
FIG. 3 is a perspective view of a first embodiment of a self-contained air handling unit subassembly in accordance with the principles of the present disclosure.
Figure 7:
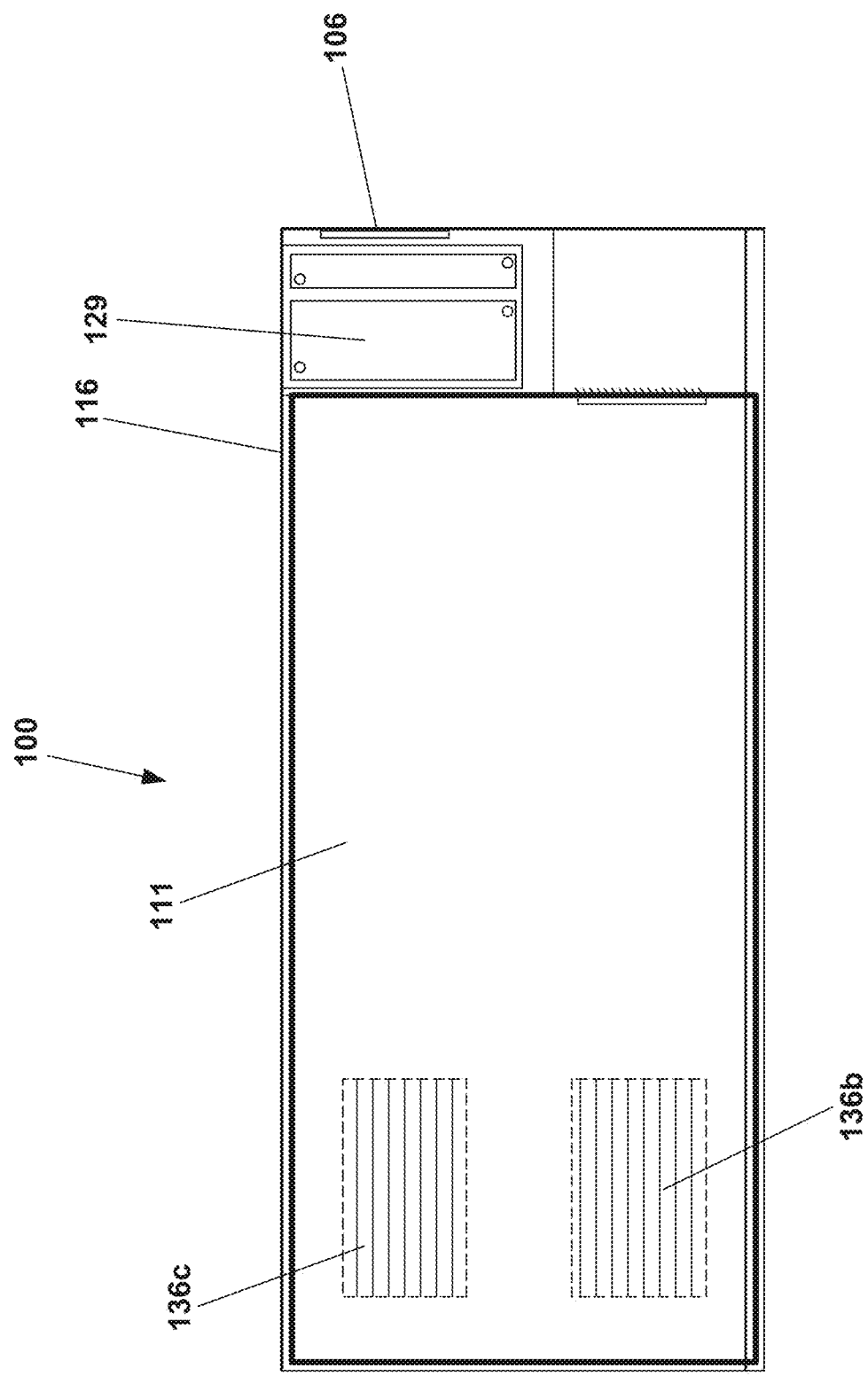
FIG. 7 is a schematic side view of the self-contained air handling assembly of FIG. 4.
Figure 8:
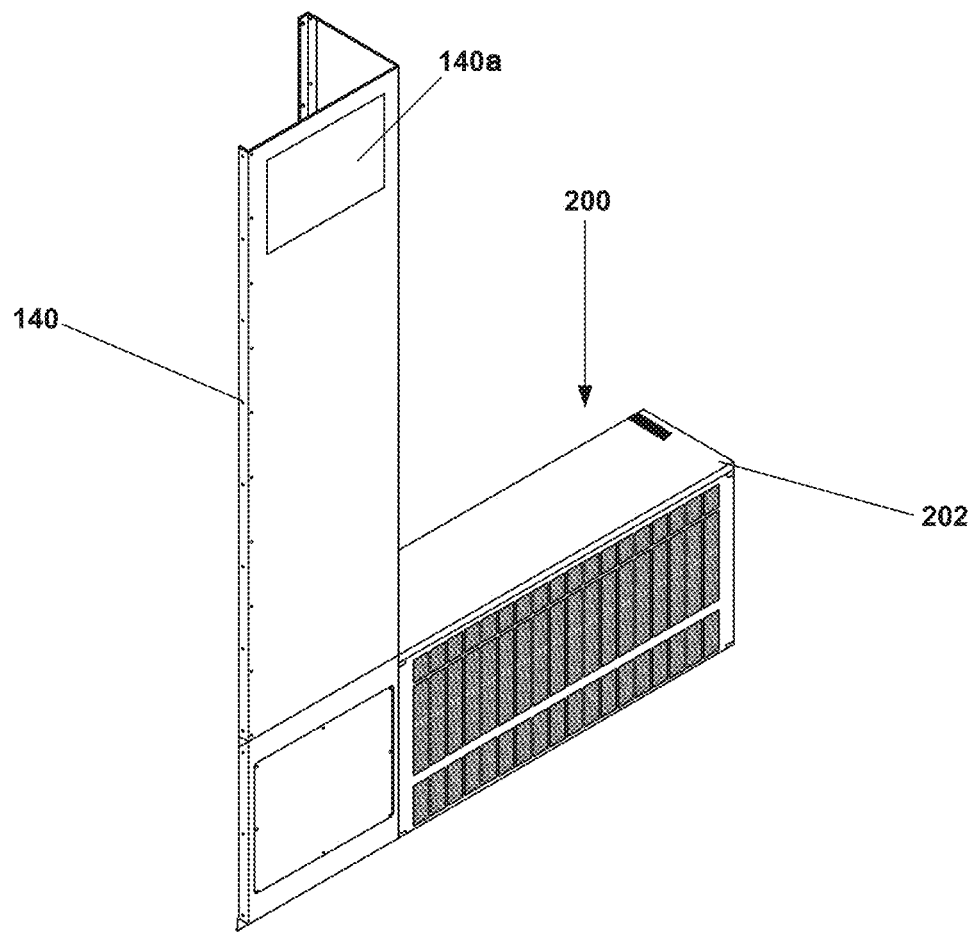
FIG. 8 is a perspective view of one embodiment of an induction-displacement unit in accordance with the principles of the present disclosure.
Figure 9:
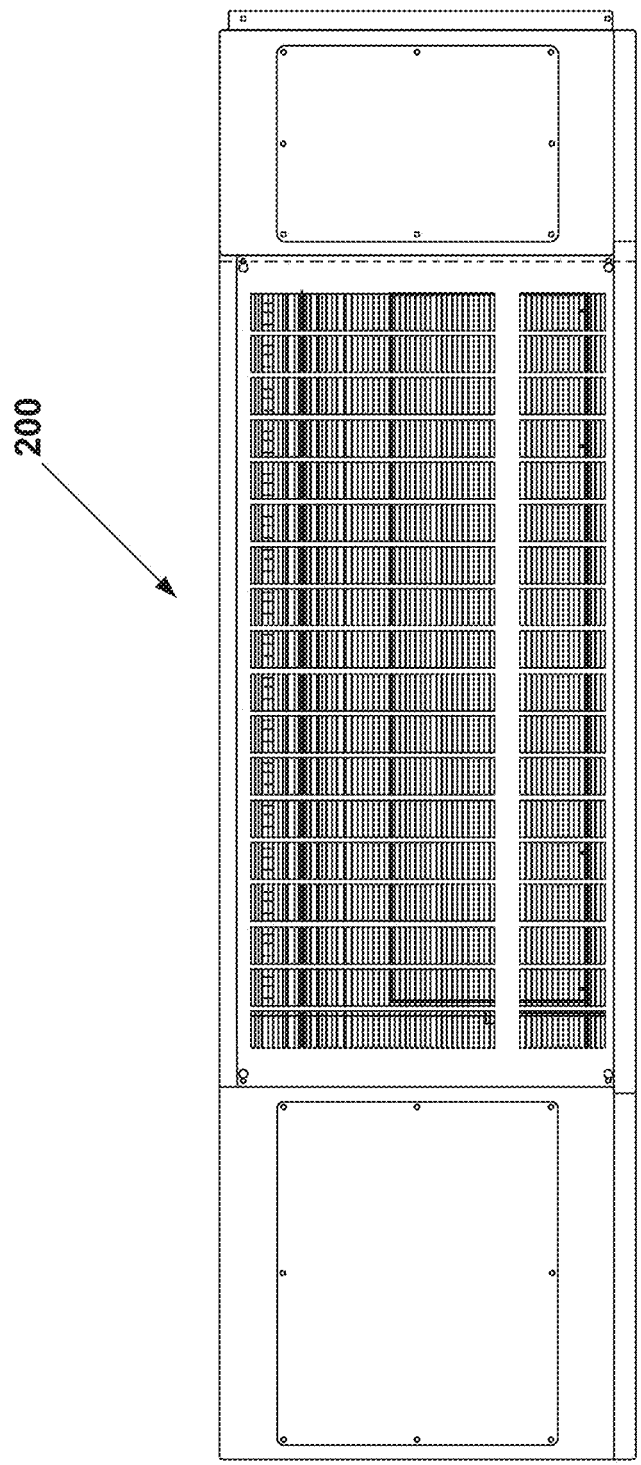
FIG. 9 is a front view of the induction displacement unit of FIG. 8.
Figure 10:
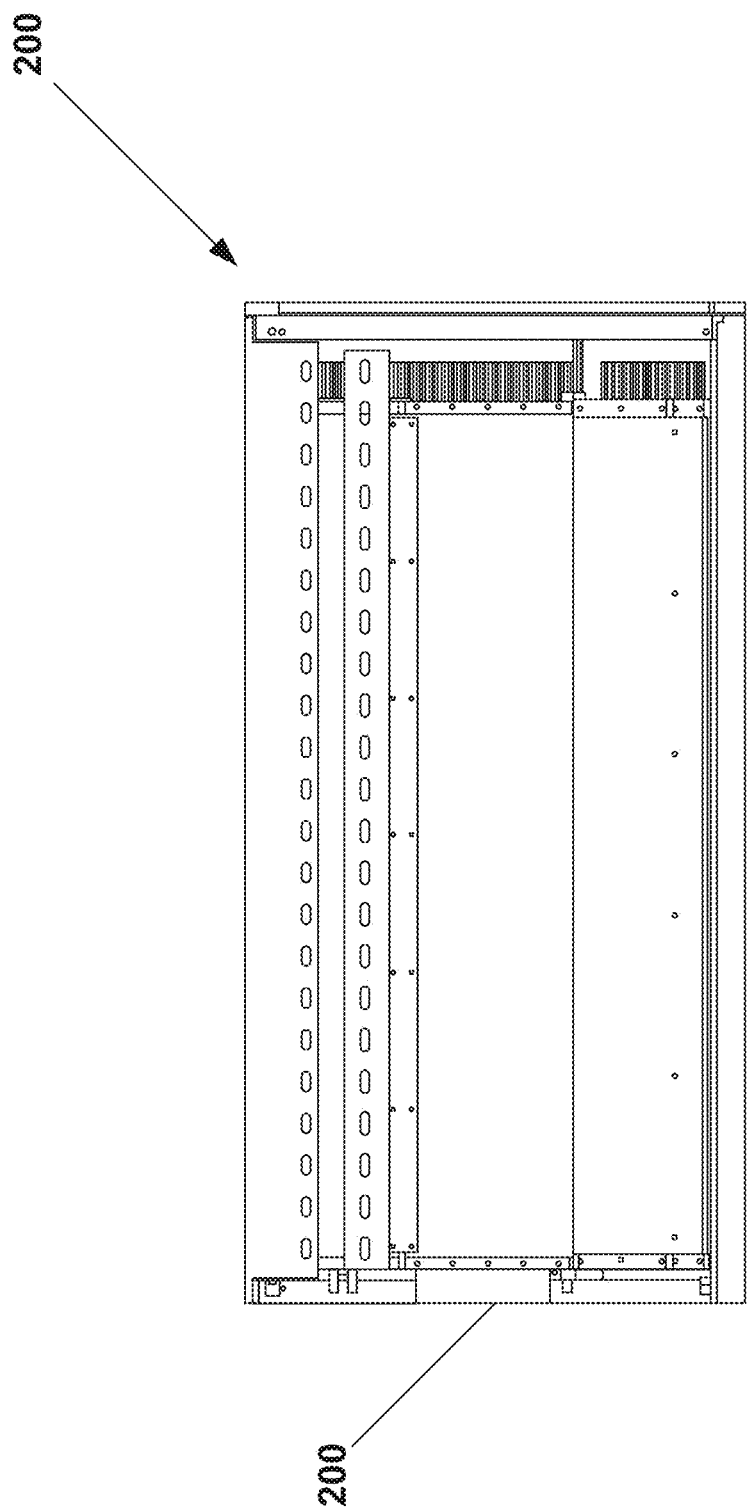
FIG. 10 is a rear view of the induction displacement unit of FIG. 8.
Figure 11:
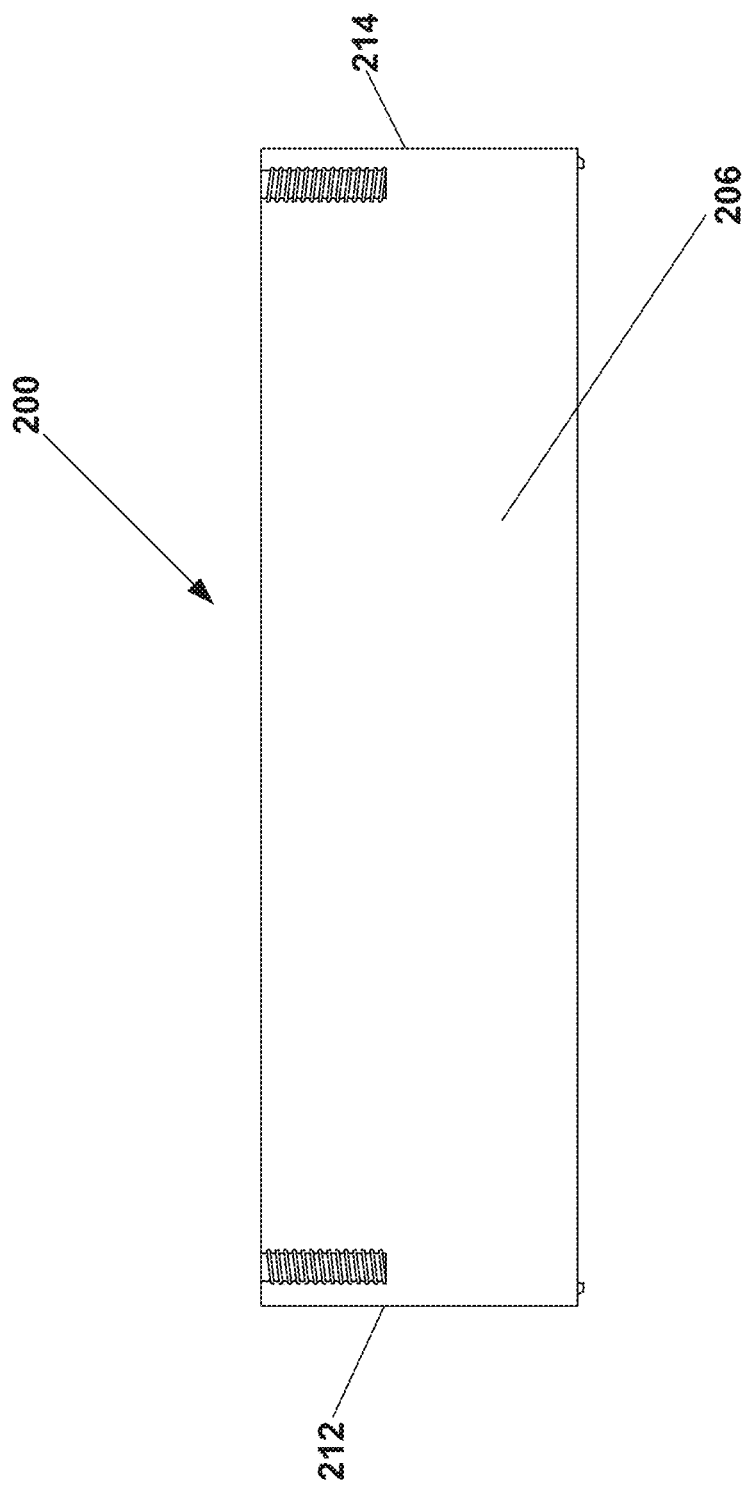
FIG. 11 is a top view of the induction displacement unit of FIG. 8.

Referring to FIG. 3, it can be seen that the first section to fifth sections 118, 122, 124, 126, 128 may be provided in a common housing 111. Referring to FIG. 7, the housing 111 is schematically shown as being received into the interior of the outer housing 116. In the example shown, the sixth section 129 is also formed within the outer housing 116. With such an arrangement, the outer housing 116 can be provided with the same size and shape as the air terminals 200 for a uniform aesthetic appearance within a room, such as a classroom. In some configurations the dampers 136b, 136c can be mounted to the outer housing 116 and in air flow communication with exhaust and ventilation air openings in the housing 111, as is schematically depicted at FIGS. 4 and 7. In some arrangements, the first through sixth sections are provided in a common housing. In some arrangements, the sixth section is provided in a housing that is mated to the housing 111.

Figure 12:
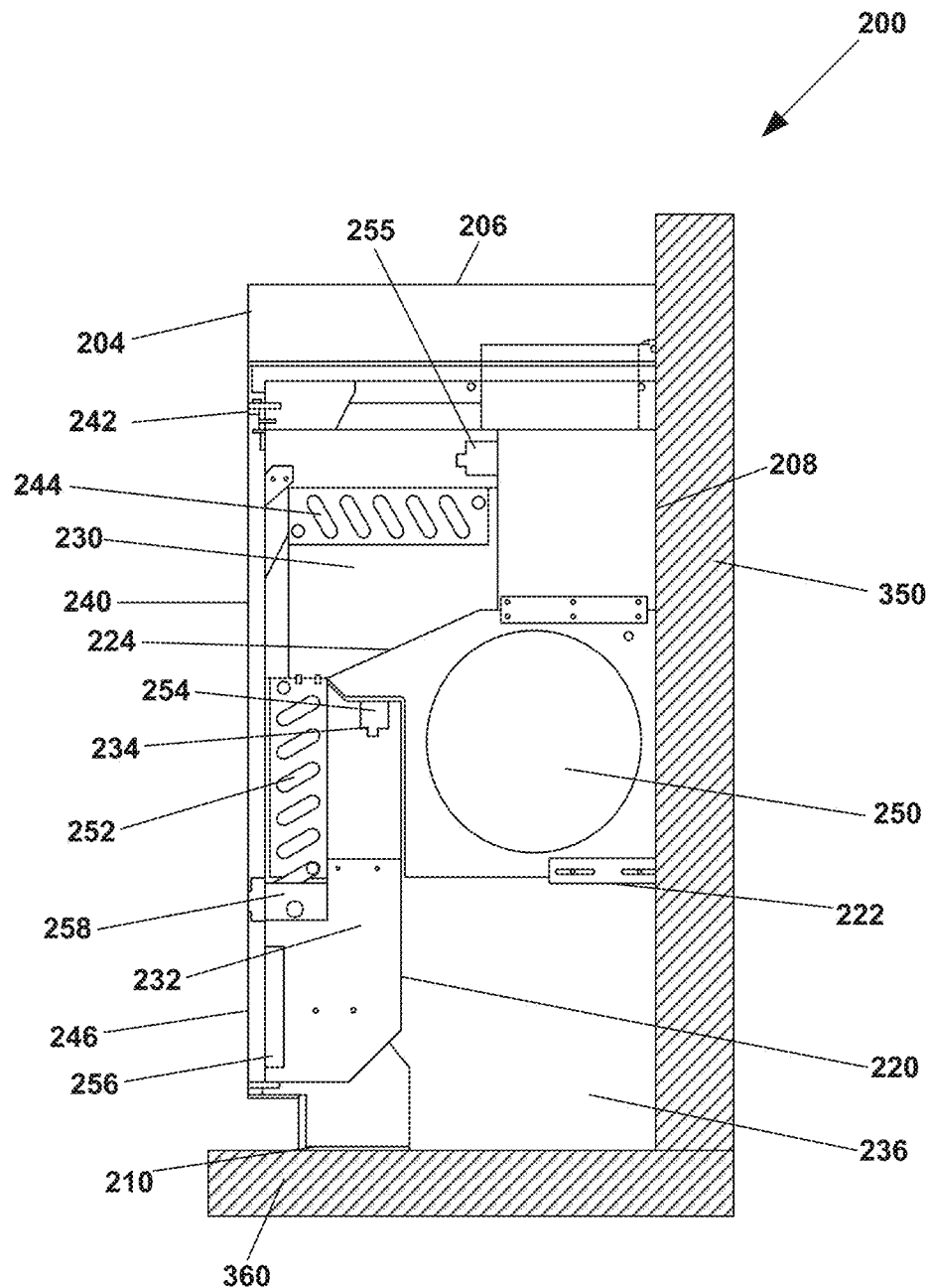
FIG. 12 is a side view of the induction displacement unit of FIG. 8.

As previously mentioned, the unit 100 may connect to a number of air terminals 200, shown in FIGS. 1 and 2. An example air terminal is shown in FIGS. 8-13. Air terminal 200 may be an induction displacement neutral wall air terminal unit. As shown, the air terminal unit 200 includes a housing 202, a front side 204, a top side 206, a rear side 208, a bottom side, 210, a first side 212, and a second side 214. In one example, air terminal 200 has a length across the front side of about 72 inches, while in another embodiment, the unit has a length of about 90 inches. However, one skilled in the art will readily appreciate that any desired length may be chosen. FIG. 2 shows three air terminals 200 connected together within the space 300 such that the rear sides 208 are adjacent to a wall 350. The bottom side 210 rests on floor 360 as can be seen in FIG. 12.

Air terminal 200 further includes interior walls 220, 222, and 224. Interior walls 220, 222, and 224 divide the interior of the air terminal 200 into four definable airflow paths: a heating airflow path 230, a supply airflow path 232, a first return airflow path 234, and a second return airflow path 236. Each is described below.

The heating airflow path 230 can be seen on FIG. 12. The heating airflow path 230 may be a neutral wall heating airflow path. The heating airflow path is for recirculating air within the space 300. The heating airflow path has a second return air inlet 240 and a heating air outlet 242. The components described herein are used for heating a heating airflow stream 231 such that space 300 can be maintained at a desired space temperature set point when in a heating mode of operation. The heating airflow path is defined by interior wall 224, front side 204, top side 206, and rear side 208. Within the heating airflow path 230 is a heating element 244. Although a single heating element 244 is shown, one skilled in the art will appreciate that multiple heating elements may be used within the heating airflow path 230 in order to achieve the desired unit heating capacity. The heating element 244 may be any type of heating element. For example, the heating element 244 may use fin-tube radiation or a heating air coil design that is either hydronic, steam, or electric based. Where the heating element 244 is hydronic, heating element 244 can connect to a heating system 400 via a piping schematic 600 shown in FIG. 14, which will be discussed in detail later.

The heating airflow path 230 may also include nozzles or openings 255 for delivering air from a ventilation air inlet duct 250 to a location downstream of the heating element 244 so as to induce air flow through the heating element. In some examples, the nozzles or openings 255 are separate structures. In some examples, the nozzles 255 are openings or perforations in a plate. Although the heating airflow stream 231 may occur via natural convention within air terminal 200, the nozzle 255 may be utilized to increase the rate of air flow through the heating airflow path 230. Increasing the airflow rate has the effect of increasing the overall heating capacity of the air terminal 200, as space heating occurs primarily by natural convection when the nozzle 255 is either inactive or not present. As such, nozzle 255 is especially useful in applications where the heating element 244 does not have a high heating capacity. This is the case when fin-tube radiation is used in conjunction with a geothermal heat pump system, as supply heating water temperatures are generally no more than 140 degrees F. In such applications, nozzles capable of inducing a total flow rate through the heating element of about 300 cfm may be desirable, depending on the heating requirements and heating capacity. A filter may also be provided upstream of a fan assembly 248 in order to better maintain operability and to help extend the useful service life of the fans. In other embodiments, the filter may be installed at or near the second return air inlet 240 to prevent dust or other contaminants from being drawn into the heating element 244. The filters may be MERV 8, 13, or 14 rated.

Figure 13:
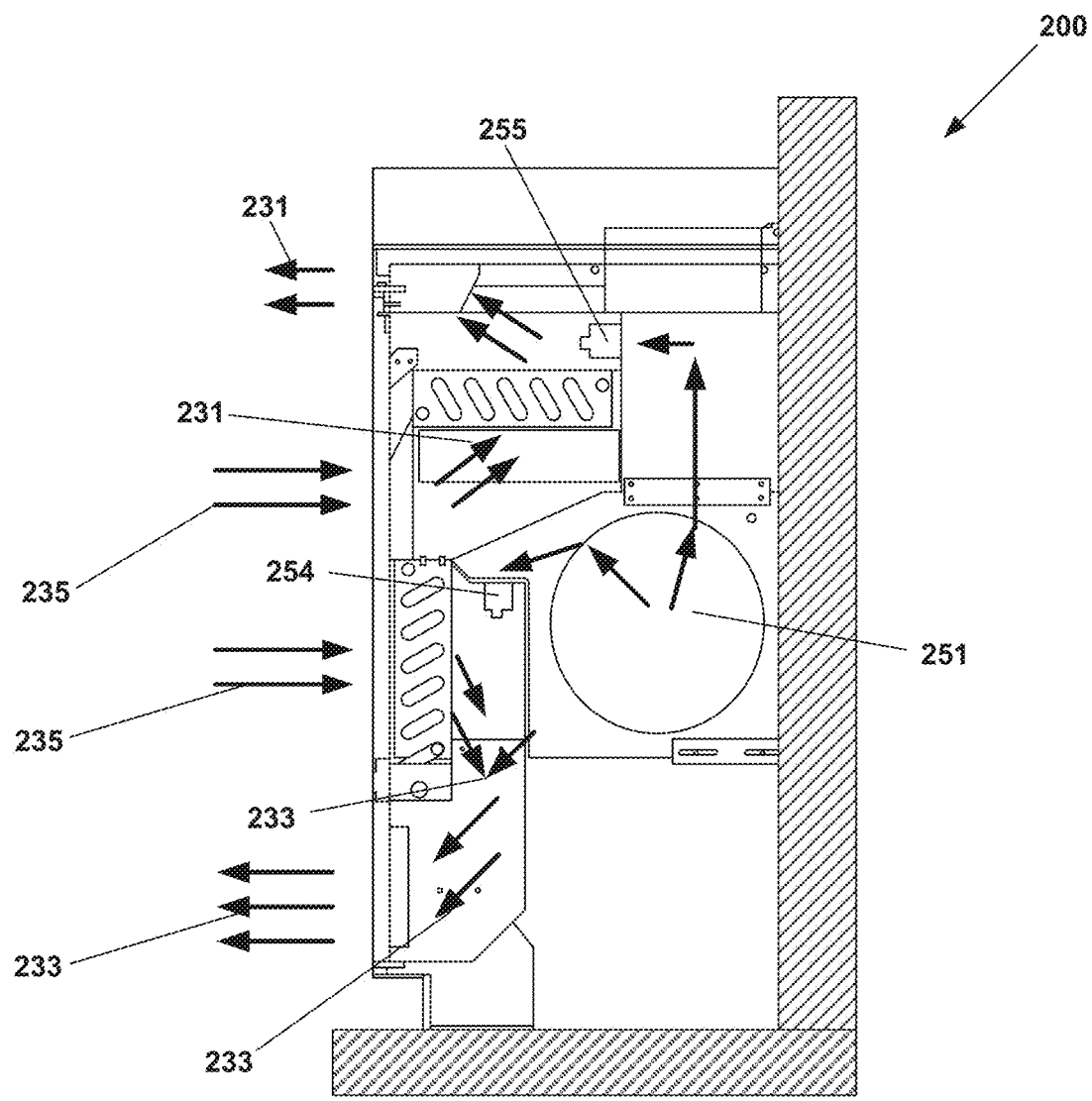
FIG. 13 is a schematic side view of the induction displacement unit of FIG. 8.

An example heating airflow stream 231 can be seen on FIG. 13. The heating airflow stream may exit the front side 204 of the unit. In some architectural designs, it may be preferable to position the heating air outlet 242 on the front side (as shown in FIG. 13), such that air terminal 200 could be built into a wall. In other examples, it may be preferable to heat exterior wall 350 more directly with a vertical heating airflow stream exiting at the top side 206.

FIG. 12 also shows the supply airflow path 232 within housing 202. The supply airflow path is for delivering a supply airflow stream 233 to the space 300 such that the space 300 can be selectively ventilated and cooled. As discussed later, the supply airflow stream 233 is the combination of a ventilation airflow stream 251 and a return airflow stream 235 from space 300. In FIG. 12, the supply airflow path 232 is defined by interior walls 220, 222, 224, and front side 204. The supply airflow path also includes ventilation air inlet duct 250 and supply air outlet 246. The ventilation air inlet duct 250 is for receiving treated ventilation air from unit 100, previously discussed. The supply air outlet 246 is for allowing the supply airflow stream to be delivered to the space 300. The supply airflow path 232 is further defined by a return air coil 252 disposed within the return airflow path 234. The return air coil 252 may condition the return air, such that the mixture of ventilation air and the conditioned return air produce the desired supply air stream 233.

Disposed within the supply airflow path 232 is at least one induction nozzle or opening 254. The induction nozzles 254 are used for increasing the velocity of the ventilation airflow stream 251 to such an extent that the return airflow stream 235 is induced into the supply airflow path 232. In some examples, the nozzles or openings 254 are separate structures. In some examples, the nozzles 254 are openings or perforations in a plate. As can be seen in FIG. 13, return airflow stream 235 is in fluid communication with the supply airflow path 232 by virtue of the return air coil 252, which is open to both the supply airflow path 232 and the return airflow path 234.

A filter may also be disposed within the supply airflow path 232 or at the second return air inlet 240. Because return air is used from the occupied space 300, it may contain unacceptably high levels of contaminants. As such, it is desirable to filter at least the return airflow stream 235 prior to reintroducing the air back into the space 300. The filter may be any type suitable for filtering the air, for example, a pleated panel filter and/or a high efficiency rated filter.

The supply airflow path may also include a baffle distribution plate 256 or other perforated plate to help evenly distribute air flow as the supply air stream 233 reaches the supply air outlet 246. The supply airflow stream 233 is generally provided to the space 300 at a temperature below the actual temperature in the space 300 so that the air can pool along the bottom portion of the space 300. However, excessive velocities of cool air injected into the space 300 can cause a sense of draftiness on the part of the occupants. As a general rule of thumb of those having skill in the art, a velocity of at or below 50 feet per second will prevent this sensation. To this end, the baffle distribution plate 256, in conjunction with the induction nozzle 254, act to maintain airflow velocities at an acceptable level while also ensuring the maximum amount of air can be delivered by distributing the airflow stream as evenly as possible. The supply air outlet 246 may include further features for equalizing the airflow velocity pattern of the supply airflow stream 233, such as having slots or louvered openings.

The ventilation air inlet duct 250 can be connected to other air terminals 200 or to other supply ductwork extending from an air handling unit of an air distribution system. As shown in FIGS. 1 and 2, three air terminals are connected. The air terminal 200 furthest from unit 100 would terminate the ventilation air inlet 250. As previously discussed, the amount of ventilation air can be controlled by the control arrangement 134.

The first return airflow path is shown in FIG. 12. As the return air stream 235 approaches the second return air inlet 240, the return air stream 235 is split between air moving into the heating airflow path 230 and air moving into the supply airflow path 232. As shown, the return airflow path 234 is the portion of the return air stream 235 moving toward the supply airflow path 232. The return airflow path is defined by interior walls 222 and 224, front side 204, and an exterior surface of ventilation air inlet 250.

Figure 14:
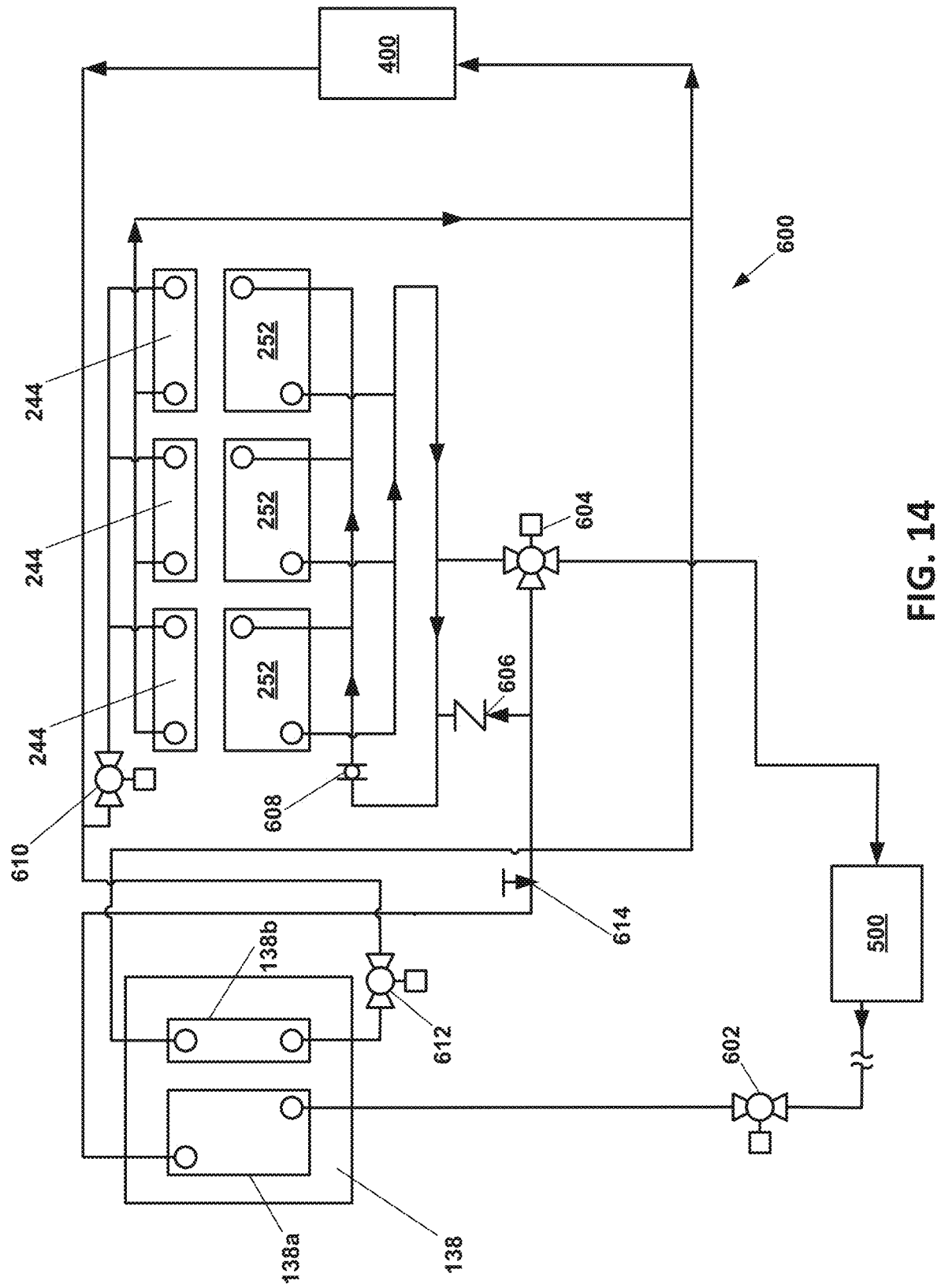
FIG. 14 is a schematic piping schematic of the air handling system of FIG. 1.

Disposed within return airflow path 234 is return air coil 252. Return air coil 252 is for cooling a portion of return airflow stream 235 before the return airflow stream 235 enters the supply airflow path 232. Below return air coil 252 is condensate pan 258 which is for capturing moisture removed from the return airflow stream 235 where latent cooling occurs. In the arrangement shown, as best seen at FIG. 13, part of return airflow stream 235 is induced through return air coil 252 and into supply airflow path 232. Once the return airflow stream 235 enters the supply airflow path 232, the ventilation airflow stream 251 and the return airflow stream 235 mix to form supply airflow stream 233. Where return air coil 252 is a hydronic coil, the coil 252 can be connected to a cooling system 500 via a supply piping system and return piping system. There are many example piping systems. One such example, piping schematic 600, is shown in FIG. 14 and will be discussed in more detail later. Cooling system 500 may be a central chilled water plant that includes piping, pumps, valving, and any type of chilled water source, for example, reciprocating chillers, centrifugal chillers, screw-driven chillers, scroll chillers, and/or geothermal heat pumps.

A second return airflow path 236 is defined by interior walls 220 and 222 and floor 360 and wall 350. The second return airflow path pulls in room air from return duct inlet 130 which may then travel through return duct 140 until it reaches the second return airflow path 236. In the example shown in FIG. 1, the return airflow path extends through three air terminals 200 before reaching the return air inlet 108 of unit 100. Air travelling through the second return airflow path 236 eventually exits the building at exhaust air discharge 120.

In operation, the air distribution system 50 has a broad range of air treatment capabilities. Air terminal 200 can simultaneously provide low temperature displacement air to the space 300 while also providing heat to the space 300. Unit 100 can pretreat air to be distributed by air terminals 200 through the heat exchanger and coil section 138. Both unit 100 and air terminals 200 include coils that may work together for improved efficiency. The coil section 138, return air coil 252, and heating element 244 may all by hydronic coils. The piping schematic 600 of FIG. 14 shows an example of how these systems may work together as part of the broader air distribution system 50.

Referring to FIG. 14, a hydronic system 600 is shown as including a heating plant 400, a cooling plant 500, the coil section 138 of unit 100, and the coils 244 and 252 of terminal units 200. In some examples, the heating plant 400 includes one or more boilers and supply pumps while the cooling plant 500 includes one or more chillers and supply pumps. In operation, the heating and cooling plants 400, 500, in conjunction with a control system, respectively generate and deliver heating and cooling water to one or more units 100, 200 located within a building. In one example, the building is an educational facility having a plurality of classrooms, wherein a unit 100 and one or more units 200 are located within each classroom. In such an application, the units 100, 200 are operated to meet temperature control setpoints associated with the classrooms by operation of valves associated with the coil section 138 and coils 244, 252. In one example, the cooling plant 500 is configured to generate and deliver 42 degree F. (Fahrenheit) cooling water while the heating plant 400 is configured to generate and deliver 180 degree F. water. Of course, other system setpoints may be used without departing from the concepts presented herein.

In the example shown, the coil section 138 has a first coil arrangement 138a and a second coil arrangement 138b located downstream of the first coil arrangement 138a. In the example shown, the first coil arrangement 138a is configured to operate as a cooling coil and receives chilled water from the cooling plant 500 to remove sensible and latent heat from the airflow stream passing through the coil section 138. After passing through the first coil arrangement 138a, the chilled or cooling water is returned to the cooling plant 500. In some examples and operational states, the return cooling water leaving the first coil arrangement 138a is about 52 degrees F. when the supply water is about 42 degrees F. As shown, a control valve 602 is provided such that the flow of cooling water through the first coil arrangement 138a can be modulated by an associated control system to meet a system setpoint, such as a leaving air temperature setpoint.

In the example shown, the second coil arrangement 138*b* is configured to operate as a heating coil and receives heated water from the heating plant 400 to add sensible heat to the airflow stream. After passing through the second coil arrangement 138*b*, the heating water is returned to the heating plant 400. In some examples and operational states, the return heating water leaving the second coil arrangement 138*b* is about 120 degrees F. when the supply water is about 140 degrees F. Other temperatures may be used. For example 180 degree F. water may be supplied to the coils. As shown, a control valve 612 is provided such that the flow of heating water through the second coil arrangement 138*b* can be modulated by an associated control system to meet a system setpoint, such as a leaving air temperature setpoint. In some examples, the coil arrangements 138*a*, 138*b* are operated simultaneously such that the second coil arrangement 138*b* reheats air initially cooled and dehumidified by the first coil arrangement 138*a*.

With continued reference to FIG. 14, it can be seen that the heating plant 400 also provides heating water to the coils 244. As shown, a control valve 610 controls flow through all of the coils 244 associated with a single room or zone. Other configurations are possible, such as separate control valves 610 for each coil 244. In one example, the control valve 610 is operated by the control system to meet a room temperature setpoint.

As shown, cooling water flow to the coils 252 is controlled by a pump 608 and a control valve 604 which is arranged as a modulating three-way control valve. In operation, the chilled water return from coil arrangement 138*b* continues through a valve 614, which can be used to balance or otherwise control flow, to a check valve 606 at which point, the return water flows to the inlet side of the pump 608 such that the pump 608 can circulate water through the coils 252. Water leaving the coils 252 can be selectively returned to the inlet of the pump 608 and to the cooling plant 500 in various proportions by operation of the control valve 604. With such a configuration, the control valve 604 controls the mixed proportion of water the leaving water from the coil arrangement 138 and the water returning from the coils 252 to maintain a water temperature setpoint entering the pump 608 and coils 252. In one example, the temperature setpoint is 57 to 58 degrees F., for example 58 degrees F. This arrangement helps to ensure that the water temperature delivered to the coils 252 is not below the dewpoint of the air passing through the coils such that no latent cooling and the related condensation occurs. Such an arrangement allows for the coils 252 to be provided without drain pans. In the example shown, the pump 608 has a capacity of between 5 and 10 gpm (gallons per minute), and in some examples, a capacity of about 6 gpm. On a call for cooling from the space temperature sensor or thermostat, the pump 608 activates to circulate water to the coils 252 while the valve 604 maintains loop temperature, as just described. The pump 608 can be provided with a variable speed drive such that the pump speed and capacity can be varied or modulated to maintain the space temperature setpoint. On/off control of the pump 608 is also possible.

Any number of sensors may be placed about piping schematic 600 in order to achieve the desired heating and cooling temperatures in space 300. The cooling system 500 and the heating system 400 may be placed in communication with the control arrangement. In one example, water temperatures are monitored and the information is sent to control arrangement 134 in order to adjust valve settings based upon the desired conditions of space 300. The modes of operation of the control arrangement allow a space to be heated, cooled, and ventilated simultaneously, as required. In general, and as described below, a supply airflow stream delivered during a cooling and ventilating operation will generally be below the actual temperature of the space being conditioned. This allows the induction-displacement ventilation described herein to operate as intended. Additionally, a heating airflow stream delivered during a heating operation will generally be above the actual temperature of the space being conditioned. As the space conditioning unit is typically located proximate a building envelope, heating losses through the envelope are overcome even as cool ventilation air is delivered to the space to maintain outside air requirements and displacement criteria.

To illustrate the different capabilities of the air distribution system 50, three examples are described below.

One possible mode of operation for air distribution system 50 is a "heating occupied mode." This mode of operation would be desirable in instances where it is known that space 300 will require both heating and ventilation at the same time. In this mode, the heating system 400 is activated and the output of heating elements 244 and fan assembly 248 can be cycled or modulated to maintain a space temperature set point for space 300. Where heating elements 244 are hydronic, valve 610 can be controlled in this manner. The fan assembly 248 can be cycled simultaneously with valve 610 operation or can be activated after valve 610 has opened fully and further heating output is necessary to satisfy the space temperature set point. Also, in this mode of operation, unit 100 can be activated such that ventilation air at the desired temperature can be delivered to the air terminals 200. Coil section 138 may heat air entering the ventilation airflow stream using the same heating system 400. Ventilation air can be further controlled by adjusting the dampers 136 and fans 112 to modulate between a minimum air flow rate and a maximum air flow rate to meet a space carbon dioxide set point. The minimum and maximum air flow rates can be entered into control arrangement 134 while the actual air flow rate can be measured by an air flow sensor. In this mode of operation, displacement ventilation air is provided to the space while heating is also provided by the air terminals 200.

Another possible mode of operation is a "heating unoccupied mode." This mode of operation would be desirable where it is anticipated that heating will be needed in space 300, but at a time when the space is unoccupied, such as in the evening for a school or office space. This mode of operation is similar to that for the heating occupied mode for control of the heating airflow stream 231. However, the unit 100 is generally deactivated and the ventilation airflow stream 251 is not delivered. In this case, the heating elements 244 of air terminals 200, and fan assembly 248, if provided, can provide all needed heating for the space 300. It is also possible to control the air terminals 200 such that heating is also provided with return air coil 252. In this circumstance, air would flow backwards through the unit from outlet 246 to inlet 240 via convection caused by heating the air with the coil 252. It is not necessary to implement a control sequence to cycle the unit 100 on because heating elements 244 and fan assembly 248 can be designed to meet the full heating load of space 300. The heating elements 244 may be made of nickel-chrome alloy insulated from housing 202 with non-rotating ceramic bushings. The heaters may further include a fail-safe automatic reset such as a disc-type thermal cut-out. The heating elements may be activated with an input signal of 0-10 volts from the control arrangement 134.

Yet another possible mode of operation is a "cooling occupied mode." This mode of operation would be desirable where it is anticipated that both cooling and ventilation will be needed in space 300. This mode of operation is similar to the heating occupied mode in terms of ventilation control. However, the cooling system 500 is activated instead of the heating system 400. To provide cooling to the space, valve 604 can be configured to modulate to maintain a space temperature set point. An additional sensor may be provided downstream of the return air coil 252 to ensure that condensation does not occur, if desired. Such a consideration would be necessary where no drain pan 258 is provided below the coil 252. Alternatively, a supply chilled water temperature from system 500 can be set such that condensation is not possible, and so that only sensible cooling occurs at the coil 252.

One skilled in the art will appreciate that many modes of operation and control sequences are possible without departing from the concepts presented herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A classroom air distribution system comprising:
   an integrated ventilation and heat recovery terminal comprising:
   a) a housing for mounting to a floor, the housing having a depth of equal to or less than 20 inches and a height of less than 32 inches;
   b) a return air inlet for receiving air;
   c) a ventilation air outlet;
   d) an outdoor air inlet for receiving air from outdoors;
   e) an exhaust air outlet for discharging exhaust to the outdoors;
   g) a heat exchanger for exchanging heat and humidity between return air moving toward the exhaust air outlet and outdoor air moving toward the ventilation air outlet, the heat exchanger oriented to minimize the housing depth;
   g) a first fan for moving outdoor air from the outdoor air inlet, through a first side of the heat exchanger, and to the ventilation air outlet;
   h) a second fan for moving return air from the return air inlet, through a second side of the heat exchanger, and to the exhaust air outlet; and
   at least one induction-displacement neutral wall air terminal unit comprising:
   a) a supply airflow path extending from the ventilation air outlet and continuing through the at least one induction-displacement neutral wall air terminal unit and to a supply air outlet at the at least one induction-displacement neutral wall air terminal unit;
   b) a return airflow path extending from a return air duct and continuing to the return air inlet;
   c) a plurality of induction-type nozzles in direct fluid communication with the ventilation air outlet and located upstream of the supply air outlet and located within a portion of the housing defining the supply airflow path such that an air flow from the ventilation air outlet flows through the plurality of induction-type nozzles and into the supply airflow path; and
   d) a plurality of displacement-type nozzles located between the supply air outlet and the plurality of induction-type nozzles and located within a portion of the housing defining the supply airflow path.

2. The classroom air distribution system of claim 1, further comprising an exhaust damper mounted to the housing and an intake damper mounted to the housing.

3. The classroom air distribution system of claim 1, wherein the heat exchanger is a flat plate type heat exchanger.

4. The classroom air distribution system of claim 1, further including a pump for circulating a fluid to the at least one induction-displacement neutral wall air terminal unit.

5. The classroom air distribution system of claim 1, wherein the integrated ventilation and heat recovery terminal further includes a multifunction coil section for conditioning air, the multifunction coil section positioned between the heat exchanger and the ventilation air outlet.

6. The classroom air distribution system of claim 1, wherein the at least one induction-displacement neutral wall air terminal unit includes three induction-displacement neutral wall air terminal units.

7. The classroom air distribution system of claim 1, wherein the housing of the integrated ventilation and heat recovery terminal has a depth equal to a depth of a housing of the at least one induction-displacement neutral wall air terminal unit.

8. The classroom air distribution system of claim 1, wherein the housing of the integrated ventilation and heat recovery terminal has a length equal to a length of a housing of the at least one induction-displacement neutral wall air terminal unit.

9. The classroom air distribution system of claim 1, wherein the housing of the integrated ventilation and heat recovery terminal has a height equal to a height of a housing of the at least one induction-displacement neutral wall air terminal unit.

10. An integrated classroom ventilation and heat recovery terminal comprising:
    a) a housing for mounting to a floor, the housing having a depth of less than 20 inches and a height of less than 32 inches;
    b) a return air inlet for receiving return air from an installed environment;
    c) a ventilation air outlet for delivering supply air to an induction displacement neutral wall air terminal unit, the ventilation air outlet arranged on the same side of the housing as the return air inlet;
    d) an outdoor air inlet for receiving outdoor air;
    e) an exhaust air outlet for discharging return air to the outdoors, the exhaust air outlet arranged on the same side of the housing as the outdoor air inlet;
    g) a heat exchanger for exchanging heat and humidity between return air moving toward the exhaust air outlet and outdoor air moving toward the ventilation air outlet, the heat exchanger oriented to minimize the housing depth;
    g) a first fan for moving outdoor air from the outdoor air inlet, through a first side of the heat exchanger, and to the ventilation air outlet;
    h) a second fan for moving return air from the return air inlet, through a second side of the heat exchanger, and to the exhaust air outlet; and
    i) a multifunction coil section for conditioning air, the multifunction coil section positioned between the heat exchanger and the ventilation air outlet.

11. The integrated classroom ventilation and heat recovery terminal of claim 10, further comprising an exhaust damper mounted to the housing and an intake damper mounted to the housing.

12. The classroom air distribution system of claim 10, wherein the heat exchanger is a flat plate type heat exchanger.

13. The classroom air distribution system of claim 10, wherein the heat exchanger, first fan, and second fan are located within a first housing that is received into a second housing.

14. The classroom air distribution system of claim 13, wherein the multifunction coil section is located within the second housing.

* * * * *